US008259936B2

(12) United States Patent
Benkert et al.

(10) Patent No.: US 8,259,936 B2
(45) Date of Patent: Sep. 4, 2012

(54) GENERATING A TRAFFIC ENCRYPTION KEY

(75) Inventors: Michael Benkert, Burgdorf-Hohenassel (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1245 days.

(21) Appl. No.: 12/026,225

(22) Filed: Feb. 5, 2008

(65) Prior Publication Data

US 2010/0027787 A1 Feb. 4, 2010

Related U.S. Application Data

(60) Provisional application No. 60/888,228, filed on Feb. 5, 2007.

(30) Foreign Application Priority Data

Feb. 5, 2007 (DE) .......................... 10 2007 005 636

(51) Int. Cl.
*H04L 9/00* (2006.01)
(52) U.S. Cl. ........... 380/45; 380/277; 380/278; 713/171
(58) Field of Classification Search .................... 380/45, 380/278; 713/171
See application file for complete search history.

(56) References Cited

U.S. PATENT DOCUMENTS 6,873,853 B2  3/2005  Kim et al.
7,293,282 B2 *  11/2007  Danforth et al. .................. 726/4

(Continued)

FOREIGN PATENT DOCUMENTS

| CN | 1771691 A | 5/2006 |
|---|---|---|
| DE | 101 03 406 A1 | 8/2002 |
| WO | WO-2005/086412 A1 | 9/2005 |

OTHER PUBLICATIONS

L. Dondeti et al.; Network Working Group, Internet Draft, Intended status: Informational, Expires: Mar. 5, 2007; "OMA BCAST MIKEY General Extension Payload Specification" draft-dondeti-msec-mikey-genext-oma-02.

(Continued)

*Primary Examiner* — April Shan
(74) *Attorney, Agent, or Firm* — Dickstein Shapiro LLP

(57) ABSTRACT

Apparatus and method for generating a traffic encryption key includes generating a traffic encryption key for encrypting data transmitted as part of a service, the traffic encryption key having a validity equal to a traffic encryption key validity time period; checking whether a period for the service is longer than the traffic encryption key validity time period; and if the period of the service is longer than the traffic encryption key validity time period, ascertaining a residual period which indicates by what period the service is longer than the traffic encryption key validity time period of the traffic encryption key; generating a residual traffic encryption key which is used for encrypting data transmitted as part of a service; ascertaining a residual traffic encryption key validity time period which indicates for how long the residual traffic encryption key is valid; and associating the residual traffic encryption key validity time period with the residual traffic encryption key.

15 Claims, 6 Drawing Sheets

U.S. PATENT DOCUMENTS

| | | | |
|---|---|---|---|
| 7,415,113 B2* | 8/2008 | Lain et al. | 380/278 |
| 7,568,111 B2* | 7/2009 | Alve et al. | 713/189 |
| 7,907,733 B2* | 3/2011 | Cho et al. | 380/273 |
| 2003/0068046 A1* | 4/2003 | Lindqvist et al. | 380/277 |
| 2004/0076298 A1* | 4/2004 | Oliver | 380/231 |
| 2006/0253577 A1 | 11/2006 | Castaldelli et al. | |
| 2009/0019284 A1* | 1/2009 | Cho et al. | 713/170 |
| 2009/0300358 A1* | 12/2009 | Pang et al. | 713/171 |

OTHER PUBLICATIONS

OMA Open Mobile Alliance; "Service and Content Protection for Mobile Broadcast Services"; Draft Version 1.0—Dec. 18, 2006; Open Mobile Alliance OMA-TS-BCAST_SvcCntProtection-Interim-Draft-20061218-D.

* cited by examiner

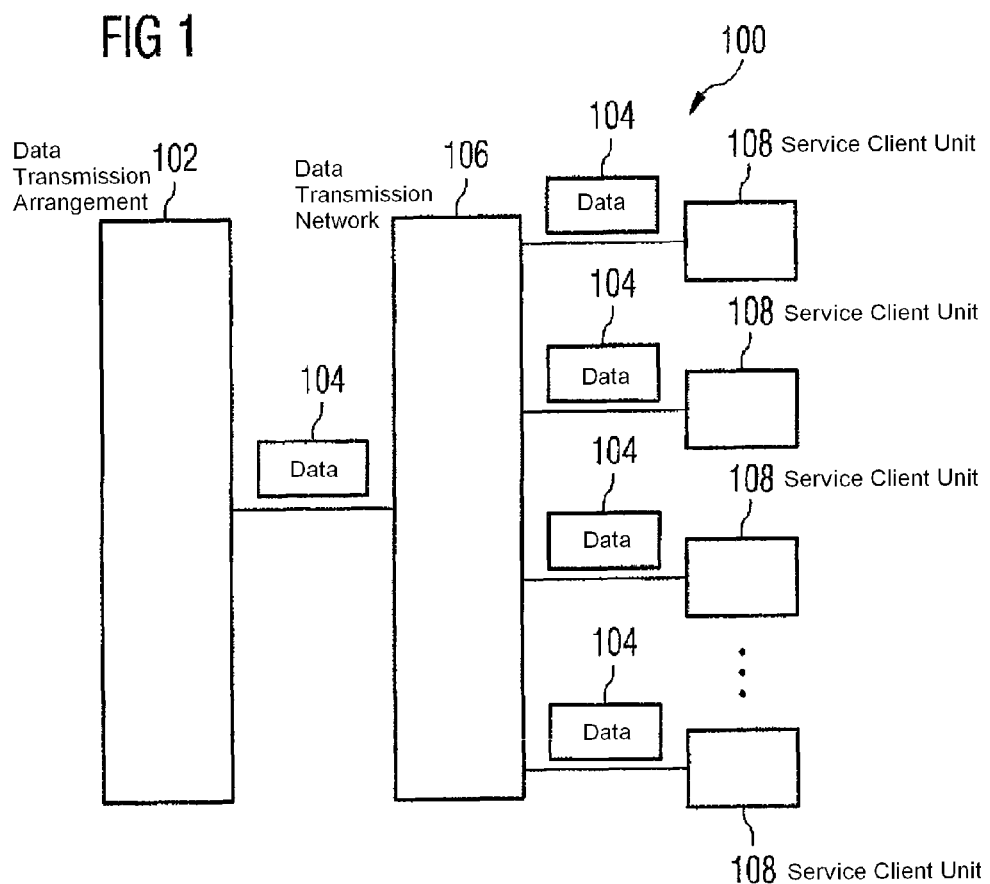

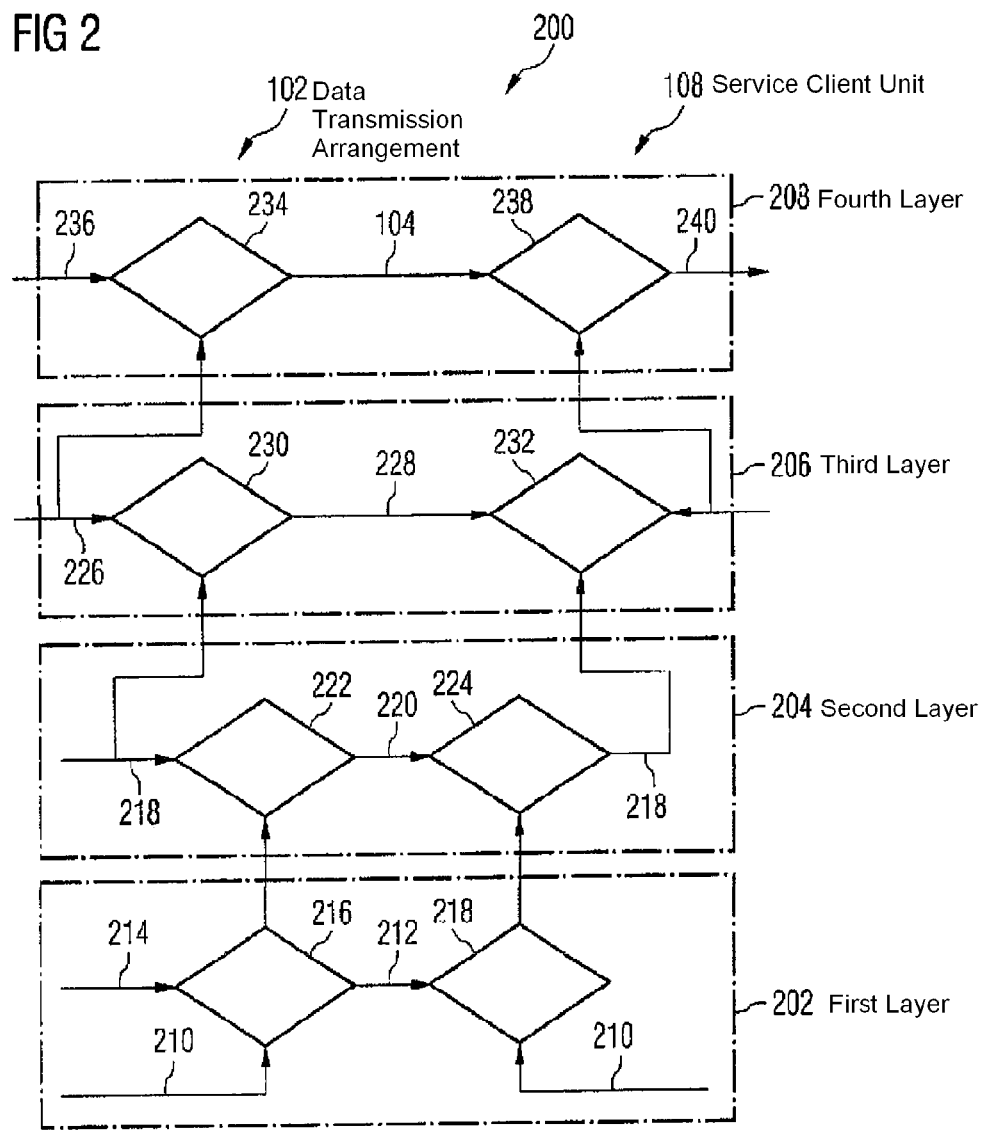

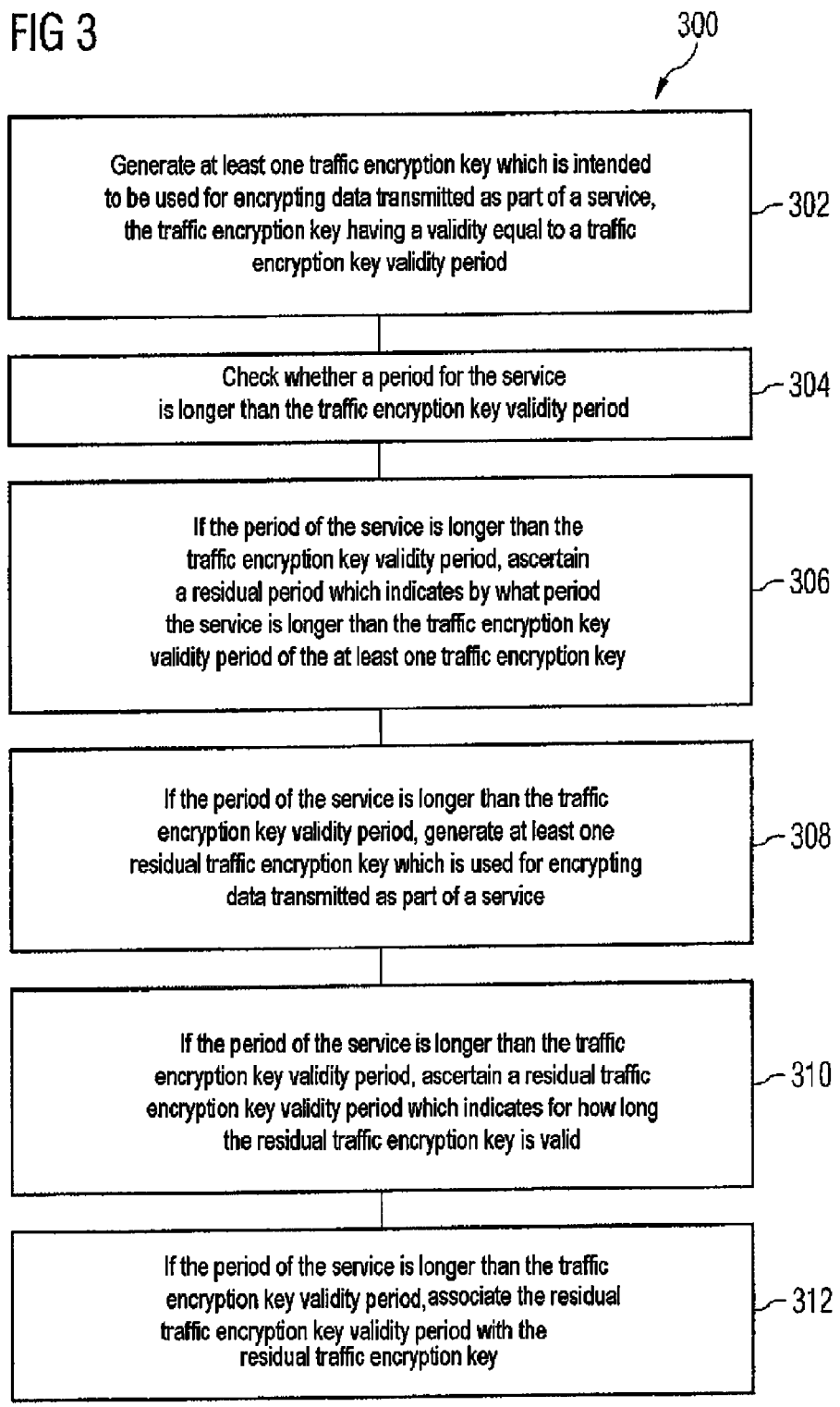

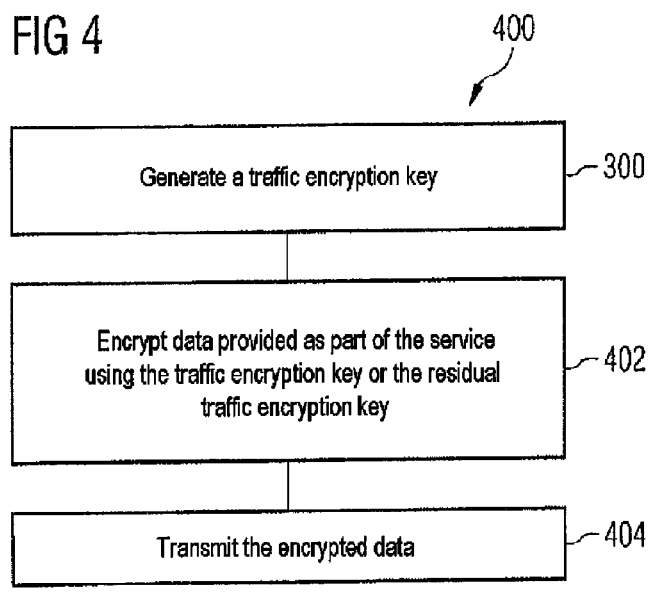
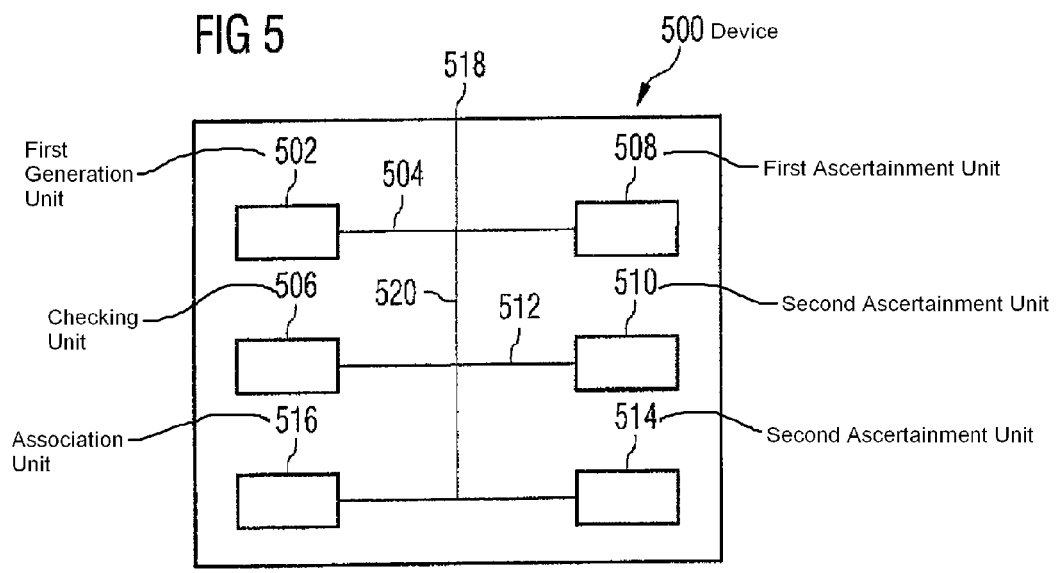

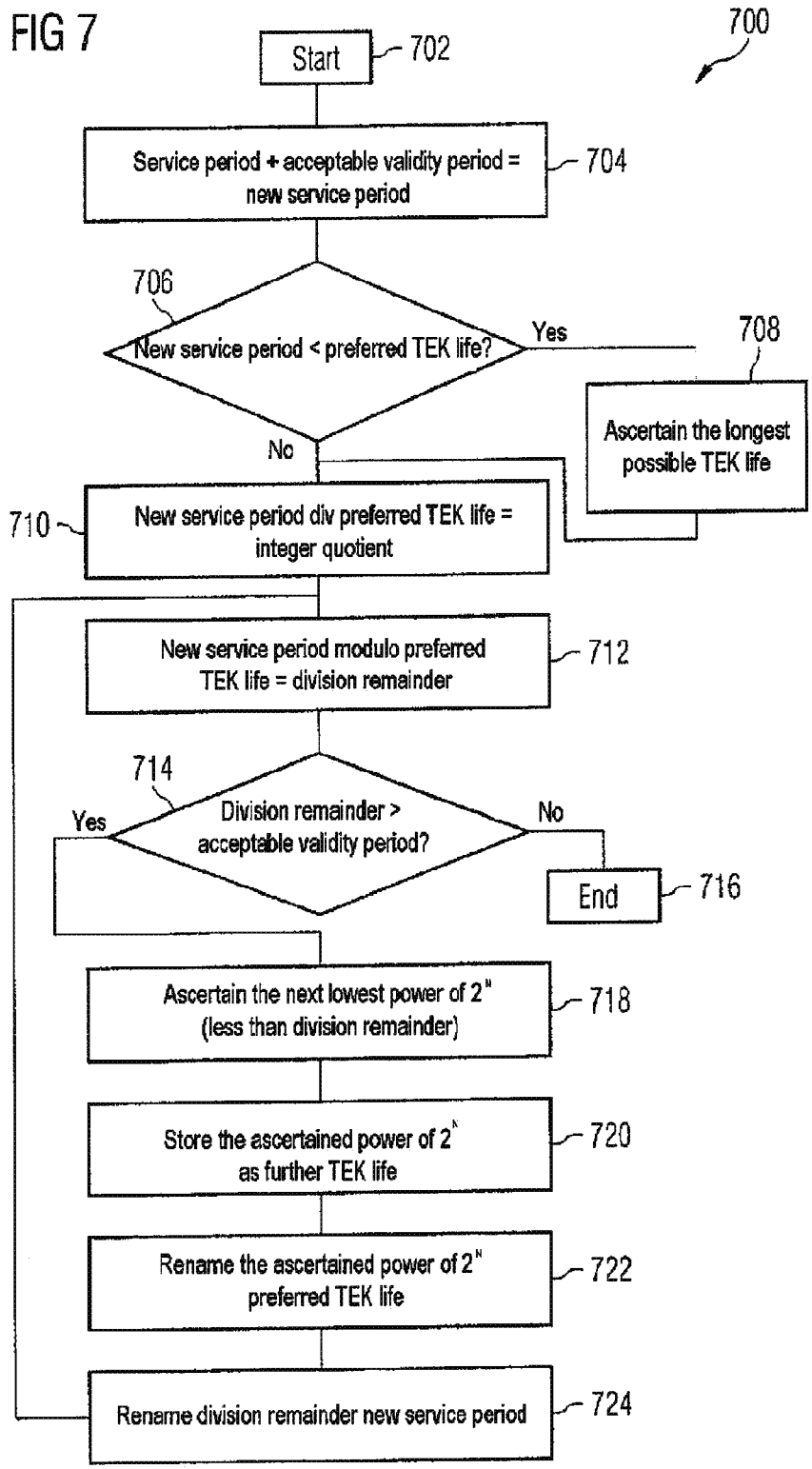

GENERATING A TRAFFIC ENCRYPTION KEY

TECHNICAL FIELD

Embodiments relate to a method for generating a traffic encryption key, a method for transmitting data, devices for generating a traffic encryption key and a data transmission arrangement.

BACKGROUND

In the age of bits and bytes, where more and more messages, information and other digital data are being transmitted by cable and air, there is also an increasing demand from owners of digital data to protect said data.

Protection against unauthorized access to the data is a significant feature, because only people who pay for access to the data, for example, are also intended to enjoy these data. One example of this is pay TV (e.g. the television channel "Premiere").

As already indicated above, there are two kinds of requirements for protection:
- protection of content, i.e. a file is intended to be able to be accessed only by the user who has actually paid for it. This is also called content protection.
- Protection of services, i.e. data provided as part of a service, for example a live-broadcast football match, are intended to be able to be received only by those who actually have the access rights for this. This is also called service protection. Service protection is particularly suitable for a service with a continuous data stream (streaming), such as TV, radio etc.

Whereas the protection of individual files (content protection) normally involves the generation of a rights object which ties the file to be protected to itself, the protection of services often involves the transmission of chronologically successive cryptographic keys with a limited validity time which allows the data stream/service to be decrypted.

It may now occur that the subscriber using a service is allocated a traffic encryption key with a life for a service from the service provider which is valid far beyond the end of the content (e.g. a feature film). This condition is undesirable to the service provider, since the subscriber would be able to access content for which he has not paid.

BRIEF DESCRIPTION OF THE FIGURES

Embodiments are shown in the figures and are explained in more detail below.

In the figures

FIG. 1 shows a system for providing one or more services based on an embodiment;

FIG. 2 shows a four-layer model of a system for providing one or more services based on an embodiment;

FIG. 3 shows a method for generating a traffic encryption key based on an embodiment;

FIG. 4 shows a method for transmitting data based on an embodiment;

FIG. 5 shows a device for generating a traffic encryption key based on an embodiment;

FIG. 7 shows a method for generating a traffic encryption key based on an embodiment.

DETAILED DESCRIPTION

Figure 6:
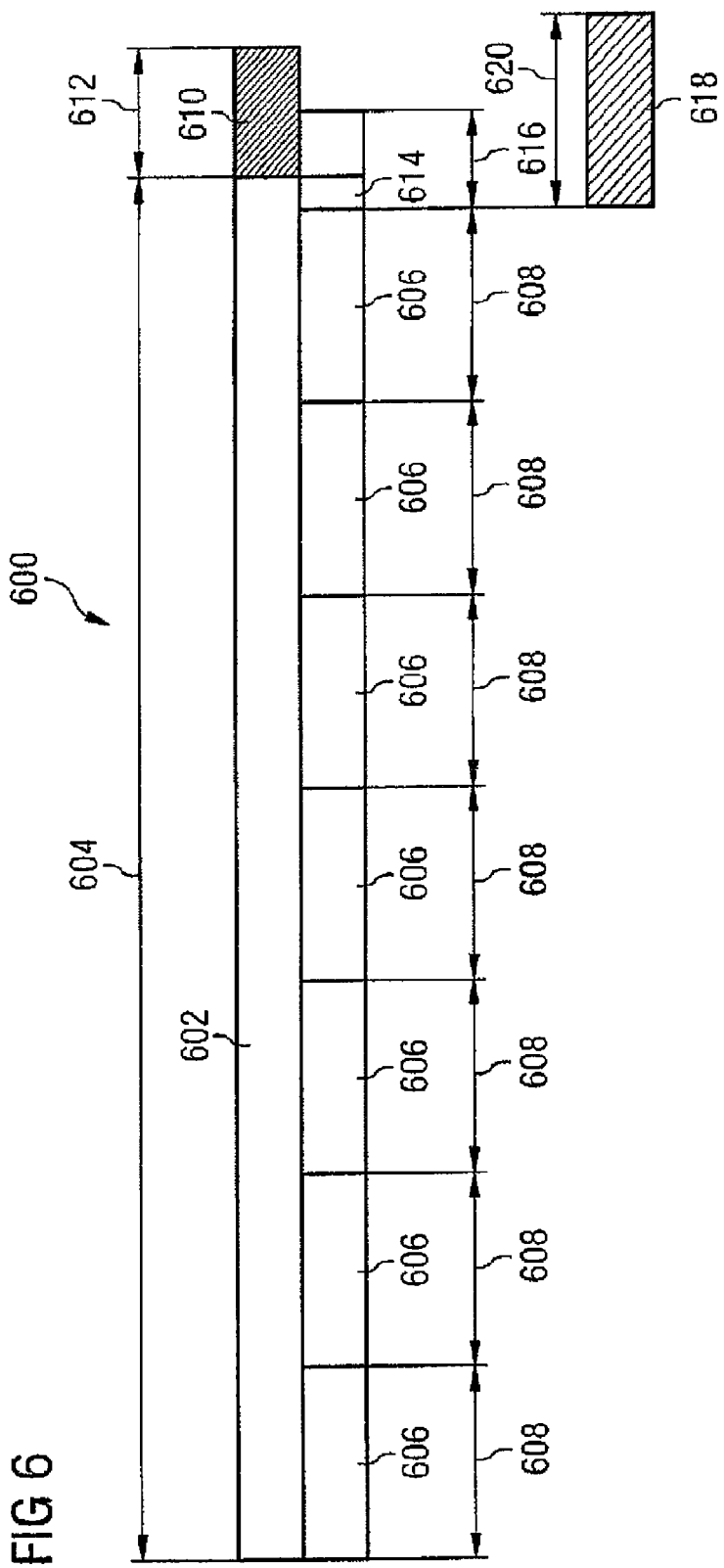
FIG. 6 shows the timing of a service and the association of traffic encryption keys with the service based on an embodiment.

In the figures, identical or similar elements are provided with identical reference symbols where expedient.

Within the context of this description, the terms "connected" and "coupled" are used to describe either a direct or an indirect connection and a direct or an indirect coupling.

FIG. 1 shows a system 100 for providing one or more services based on an embodiment.

The system 100 has a data transmission arrangement 102 belonging to a service provider and a data transmission network 106 and one or more, in line with one embodiment any number of, service client units 108. In line with one embodiment, the service provider provides the service client units 108 with different services, for example data transmission services which involve the data transmission arrangement 102 generating data 104 and the data transmission network 106 being used to transmit said data to the service client units 108 which are respectively authorized to use the service, in a prescribable manner.

As has been explained above, considerable importance is attached, within the context of providing electronic services, to protection against unauthorized access to the data provided and transmitted as part of a service, because only those who actually pay for access to the data or a service, for example, are also intended to enjoy these data (or this service).

For protecting against unauthorized access to data provided and transmitted as part of a service, there are two kinds of requirements, inter alia:
- protection of content, i.e. a file is intended to be able to be accessed only by the user who has actually paid for it. This is also called content protection.
- Protection of services, i.e. data provided as part of a service, for example a live-broadcast football match, are intended to be able to be received only by those who actually have the access rights for this. This is also called service protection. Service protection is particularly suitable for a service with a continuous data stream (streaming), such as e.g. TV, radio etc.

Whereas the protection of individual files (content protection) normally involves the generation of a rights object which ties the file to be protected to itself, the protection of services often involves the transmission of chronologically successive cryptographic keys with a limited validity time which allows the data stream/service to be decrypted.

The standardization committee OMA (Open Mobile Alliance) is currently standardizing service protection within the group BCAST (Mobile Broadcast Services), together with the group DLDRM (Downlink Digital Rights Management). The embodiments described below relate to this architecture for reasons of simpler presentation. However, it should be pointed out that the embodiments are not limited to an OMA architecture. Rather, the embodiments can be applied to any type of service protection which involves the use of a traffic encryption key to protect a service (for example cryptographically).

On the basis of the architecture provided as part of the OMA, particular focus is placed on new business models which require particular solutions for protecting the cryptographic keys used.

For this purpose, the four-layer model 200 shown in FIG. 2 is provided, which will be explained in more detail below. It should be pointed out that the four-layer model 200 is merely intended to serve as an example in which the cryptographic key on a lower layer protects the content (the content may itself again also be a cryptographic key) on the superordinate layer.

In line with one embodiment, the service provider uses the data transmission arrangement 102 to provide a service or a plurality of services and to provide them to a subscriber when he has subscribed as appropriate.

In one embodiment, the service provider uses the data transmission arrangement 102 to provide communication services, for example one or more broadcast services, for example one or more video broadcast services or one or more audio broadcast services. In one embodiment, the provision of the one or more services involves a continuous data stream (also called streaming) or a plurality of continuous data streams being generated and transmitted to the subscribing service client unit(s) 108.

Examples of a service are:
pay TV (for example the pay TV channel "Premiere", Internet Protocol TV (IPTV) or Video on Demand);
pay radio;
gaming, in other words the provision of a games platform for a prescribed period to one subscriber or to a plurality of subscribers;
etc.

In line with one embodiment, the data transmission network 106 is an network, for example a network in a radio transmission system, for example a radio broadcast transmission system, or a network in a mobile radio transmission system, for example a cellular mobile radio transmission system, such as a cellular mobile radio transmission system based on
a Group Special Mobile (GSM) standard,
a Third Generation Partnership Project (3GPP) standard, such as based on a General Packet Radio System (GPRS) standard, based on an Enhanced Data for GSM Evolution (EDGE) standard, based on a Universal Mobile Telephone System (UMTS) standard, based on a Long Term Evolution (LTE) standard, etc.
a Freedom of Mobile Multimedia Access (FOMA) standard,
a Code Division Multiple Access (CDMA) standard,
a Code Division Multiple Access (CDMA) 2000 standard, etc.

In one embodiment, the data transmission network 106 can be constructed from or formed from components of different communication networks.

In line with one embodiment, when a subscriber has validly registered, in other words subscribed, for a service provided by the service provider, the service provider uses the data transmission arrangement 102, for example, to provide the subscriber, to be more precise the service client unit 108 belonging to the respective subscriber, with one or more cryptographic keys which allow the transmitted data 104, which are usually encrypted on the basis of a cryptographic encryption method (for example on the basis of the Data Encryption Standard or on the basis of the Advanced Encryption Standard (AES), etc.), to be decrypted.

In line with one embodiment, the one cryptographic key or the plurality of cryptographic keys is/are also called traffic encryption key(s).

In line with one embodiment, a traffic encryption key has a prescribed life, in other words a traffic encryption key validity time period, during which the traffic encryption key is valid and hence can be used, as part of the service, for decrypting the data encrypted and transmitted using the traffic encryption key. When the traffic encryption key validity time period has expired, the respective traffic encryption key can no longer be used for decrypting the encrypted data 104 and hence the subscriber can no longer access the unencrypted data.

Although the lifetime can adopt values between seconds and hours, the service providers should define the respective traffic encryption key only for relatively short lifetimes (e.g. periods of 256 or 512 seconds). This is not imperatively prescribed, however.

In line with one embodiment, the traffic encryption key validity time period can be stipulated individually for each traffic encryption key, for example at a prescribable time interval whose usable reference points are values of $2^n$. In one embodiment, the traffic encryption key validity time period for each traffic encryption key can be selected from the following values (the values indicate lifetimes in seconds): 1, 2, 4, 8, 16, 32, 64, 128, 256, 512, 1024, 2048, 4096, 8192, 16384, 32768. In an alternative embodiment, any other values can be selected for the lifetime of the respective traffic encryption keys, for example values which are obtained from exponentiation with other base values (for example $3^n$, $4^n$, $5^n$, $6^n$, $7^n$, $8^n$, $9^n$, $10^n$, etc.).

It may occur that the subscriber is allocated a traffic encryption key with a lifetime for a service from the service provider which is valid far beyond the end of the content (data) (e.g. a feature film). This condition is undesirable to the service provider, since in this case the subscriber would be able to access content (data) from which he has not paid.

One embodiment addresses the scenario described above.

It should be pointed out that embodiments can be applied not only to the applications standardized on the OMA but rather can, in principle, be applied to any technologies which protect their services by means of encryption (e.g. pay TV, IPTV, broadcasting in general, etc.), for example.

Normally, the service provider sends the subscriber (to be more precise: the respective service client unit 108) a traffic encryption key with a lifetime which is preset for the service (e.g. 512 seconds). Shortly before the validity of the traffic encryption key expires, the subscriber is again sent a traffic encryption key for the e.g. next 512 seconds, for example in the continuous data stream of a provided service. Considering that a traffic encryption key may also have a longer lifetime than e.g. 512 seconds and that a subscriber is allocated a traffic encryption key with a long lifetime shortly before the end of the service, it is obvious that the subscriber can decrypt this service for the remaining validity period of the traffic encryption key and therefore has free access to the service. This should be prevented in line with one embodiment.

One embodiment provides a method which is used to match the lifetimes of the traffic encryption keys to the period of the content of the service as best possible in very simple fashion, so that unwanted access to subsequent content (data) is minimized/optimized.

In line with one embodiment, the principle is based on the assumption that a period preferred by the service operator (e.g. 256 seconds, $2^n$ for n=[0, 1, 2, . . . , 14, 15, . . . ] exists for the life of the traffic encryption keys. In addition, the service operator can define an optional period (in seconds) in which the subsequent content (the subsequent data) may still be received (acceptable validity <preferred lifetime of the traffic encryption keys). This parameter does not state that the service has precisely the additional lifetime/period determined by the parameter, but rather that the service provider allows/accepts that the service can be received freely in the additional period if the valid lifetimes of the traffic encryption keys so allow.

If a service provider would like a service to be able to be received for precisely 60 seconds longer, for example, he would conventionally need to add 60 seconds to the service period in advance and define a value of zero for the acceptable validity.

Referring again to FIG. 2, the four-layer model 200 is shown which is provided on the basis of one embodiment. The four-layer model 200 has four layers, namely a first layer 202 (layer 1), a second layer 204 (layer 2), a third layer 206 (layer 3) and a fourth layer 208 (layer 4).

One or more continuous data streams can be transmitted from the data transmission arrangement 102 to one or more service client units 108 using data which are provided by a source encoder or from a file. In line with an embodiment, the data in the continuous data stream(s) are protected using the content protection or the service protection based on the four-layer model 200.

The four-layer model 200 is based on a key management model architecture which has four layers and which allows both cryptographically protected subscription to be assured and cryptographically protected acquisition of pay-per-view options for an individual service.

FIG. 2 shows both the logical peer-to-peer communication between units on the same layer and the communication between the individual layers 202, 204, 206, 208.

The right-hand side of FIG. 2 shows the part of the key management which is provided in the data transmission arrangement 102, in general terms at the service provider's premises.

When the subscriber and hence the respective service client unit 108 has validly subscribed with the service provider, the service provider uses the data transmission arrangement 102 to generate a service client unit key (also called device key or smart card) 210 and transmits it to the respective service client unit 108 (not shown in FIG. 2).

Depending on the key management profile (DRM profile or smart card profile), one embodiment involves either what is known as a rights encryption key 214 (REK) or what is known as a subscriber management key 214 (SMK) being generated by the data transmission arrangement 102 by an appropriately configured unit in layer 1 202 and being transmitted to the respective service client unit 108 as registration data 212, for example encrypted using the service client unit key 210 (the encryption is symbolized by block 216 in FIG. 2, and the corresponding decryption on the service client unit 108 is symbolized by block 218 in FIG. 2). The registration data 212 are generated during the registration phase and are transmitted to the subscriber or his service client unit 108.

The rights management key 214 and/or the subscriber management key 214 is/are transmitted to the respective service client unit 108.

The rights encryption key 214 and/or the subscriber management key 214 is/are used for encrypting a service key 218 and/or a program key 218 which is/are transmitted in a long term key message 220 (LTKM) from, by way of example, a unit in layer 2 204 of the data transmission arrangement 102 to an appropriate unit in layer 2 204 of the respective service client unit 108. The encryption of the service key 218 or of the program key 218 is symbolized by means of the block 222 in FIG. 2, and the corresponding decryption of the long term key message 220 by the respective service client unit 108 to ascertain the service key 218 or the program key 218 is symbolized by means of the block 224 in FIG. 2.

In addition, in line with the four-layer model, a traffic encryption key 226 (TEK) is provided which is generated by a unit in layer 3 206 of the data transmission arrangement 102 and, having been encrypted using the service key 218 or the program key 218 in a short term key message 228 (STKM), is transmitted to the respective service client unit 108.

The encryption of the traffic encryption key 226 is symbolized by means of the block 230 in FIG. 2, and the corresponding decryption of the long term key message 220 by the respective service client unit 108 using the service key 218 or the program key 218 to ascertain the traffic encryption key 226 is symbolized by means of the block 232 in FIG. 2.

In line with one embodiment, the short term key message 228 also contains an identification statement for implicitly identifying the respective subscribed program or service. A service client unit 108 uses this identification statement to identify the respective long term key message 220 to be used for decrypting the short term key message 228.

In line with one embodiment, the traffic encryption key 226 is used for encrypting the actual data which are intended to be protected as part of the service or as a file (for example the continuous data stream to be protected). In other words, the content, in other words the data 236, is encrypted using a unit in layer 4 208 of the data transmission arrangement 102 (symbolized by block 234 in FIG. 2), is transmitted by means of a broadcast channel or by means of an interactive channel as encrypted data 104 to the respective service client unit 108, is received there and is decrypted using the traffic encryption key 226, which is likewise present there, in line with a symmetrical encryption method (e.g. DES or AES) (symbolized by block 238 in FIG. 2), which means that decrypted data 240 corresponding to the data 236 (that is to say the continuous data stream, for example) are ascertained and presented to the user of the respective service client unit 108, i.e. the subscriber to the service, for example.

Hence, in line with one embodiment, the actual content of the services (i.e. the (continuous) data stream, for example) is transmitted in layer 4 208. It is protected by the traffic encryption key 226 (e.g. encrypted in line with a symmetrical encryption method), which has a limited lifetime and for this reason is periodically updated and transmitted to the respective service client unit 108, for example in the continuous data stream.

Although the lifetime can adopt values between seconds and hours, the service provider should define the traffic encryption key only for relatively short lifetimes (for example periods of 256 seconds or 512 seconds). This is not imperatively prescribed, however.

It should be pointed out that the embodiments are not limited to the applications described and standardized as part of the OMA but rather can, in principle, be applied to any technologies which protect their services by means of encryption (for example pay TV, IPTV, broadcasting in general, etc.).

FIG. 3 shows a method 300 for generating a traffic encryption key based on an embodiment.

At 302, at least one traffic encryption key is generated which is intended to be used or is used for encrypting data transmitted as part of a service, the traffic encryption key having a validity equal to a traffic encryption key validity time period.

At 304, a check is performed to determine whether a period for the service is longer than the traffic encryption key validity time period.

If the period of the service is longer than the traffic encryption key validity time period, a residual period is ascertained at 306 which indicates by what period the service is longer than the traffic encryption key validity time period of the at least one traffic encryption key.

Also, in this case, at 308, at least one residual traffic encryption key is generated which is used for encrypting data transmitted as part of a service.

Also, in this case, at 310, a residual traffic encryption key validity time period is ascertained which indicates for how long the residual traffic encryption key is valid.

In line with one embodiment, a check is performed in this context to determine whether the residual period is longer than a prescribed acceptable validity period. If the residual period is longer than the prescribed acceptable validity period, the residual traffic encryption key validity time period is matched to the residual period.

In one embodiment, the residual traffic encryption key validity time period is matched to the residual period iteratively, each iteration being able to have the following provision:

If the residual period is longer than the prescribed acceptable validity period, a preferred traffic encryption key validity time period is reduced by a prescribed value (for example by a value of a power to a prescribed base value, for example by a value of a power to a base value two).

In addition, in one embodiment, a check is performed to determine whether the residual period is longer than the preferred traffic encryption key validity time period.

If the residual period is not longer than the reduced preferred traffic encryption key validity time period, the preferred traffic encryption key validity time period is associated with the residual traffic encryption key.

In addition, if the residual period is longer than the reduced preferred traffic encryption key validity time period, the reduced preferred traffic encryption key validity time period is associated with an additional residual traffic encryption key. Also, the reduced preferred traffic encryption key validity time period is defined as the preferred traffic encryption key validity time period, and the residual period is reduced by the reduced preferred traffic encryption key validity time period. In addition, the reduced residual period is defined as the residual period, and an additional iteration is performed.

At 312, the residual traffic encryption key validity time period is associated with the residual traffic encryption key in this case.

FIG. 4 shows a method 400 for transmitting data based on an embodiment.

First, a traffic encryption key is generated, for example in line with the method 300 shown in FIG. 3 or in line with a method as described below.

Next, at 402, data provided as part of the service are encrypted using the traffic encryption key or the residual traffic encryption key.

At 404, the encrypted data are transmitted, for example to one or more service client units 108.

FIG. 5 shows a device 500 for generating a traffic encryption key based on an embodiment.

In general, any type of device may be provided which provides the functionality described above for generating a traffic encryption key. Thus, the device can be implemented using a processor or using a plurality of processors, for example using a programmable processor, for example using a microprocessor.

Referring to FIG. 5, the device 500 for generating a traffic encryption key based on an embodiment has a first generation unit 502 for generating at least one traffic encryption key 504 which is intended to be used or is used for encrypting data transmitted as part of a service, the traffic encryption key 504 having a validity equal to a traffic encryption key validity time period.

In addition, a checking unit 506 is provided for checking whether a period for the service is longer than the traffic encryption key validity time period.

In addition, a first ascertainment unit 508 is provided which is configured so that, if the period of the service is longer than the traffic encryption key validity time period, it ascertains a residual period which indicates by what period the service is longer than the traffic encryption key validity time period of the at least one traffic encryption key.

In line with one embodiment, a second generation unit 510 is provided which is configured so that, if the period of the service is longer than the traffic encryption key validity time period, it generates at least one residual traffic encryption key 512 which is used for encrypting data transmitted as part of a service.

In addition, a second ascertainment unit 514 is provided which is configured so that, if the period of the service is longer than the traffic encryption key validity time period, it ascertains a residual traffic encryption key validity time period which indicates for how long the residual traffic encryption key is valid.

A similarly provided association unit 516 is configured so that, if the period of the service is longer than the traffic encryption key validity time period, it associates the residual traffic encryption key validity time period with the residual traffic encryption key 512.

The first generation unit 502, the checking unit 506, the first ascertainment unit 508, the second generation unit 510, the second ascertainment unit 514 and the association unit 516 are coupled to one another and to an input/output interface 518, for example by means of a bus 520.

FIG. 6 uses an illustration 600 to show the timing of a service 602 and an association between traffic encryption keys 606 and the service 602 based on an embodiment.

In one embodiment, it is assumed that a service provider uses the data transmission arrangement 102 to provide one or more service client units 108 with a service 602 which lasts for a prescribed period 604 (subsequently also called service period).

As presented above, the data transmitted as part of the provided service 602 are encrypted using one or more (possibly different) traffic encryption key(s) 606. The traffic encryption key(s) 606 respectively has/have a prescribable validity period 608, subsequently also called traffic encryption key validity time period 608, during which the respective traffic encryption key 606 is used for encrypting the data and hence can be used successfully by a respective service client unit 108 in order to decrypt the data 104 encrypted using the traffic encryption key 606 again. The traffic encryption key validity time period 608 can be chosen differently within the context of provision of the service 602, as has been explained above.

In line with one embodiment, the service provider accepts that the service client unit(s) 108 can still use the traffic encryption key which has then be transmitted to the respective service client unit 108 last (subsequently, the key is also called the residual traffic encryption key) to decrypt received data even after the service 602 has been terminated. This is subsequently also called the admissible validity 610 of the respective traffic encryption key 606 after the service 602 has expired. The admissible validity 610 has an acceptable validity period 612, as shown in FIG. 6.

In line with one embodiment, as will be shown in more detail below, the prescribed admissible validity 610 is taken into account to adjust, for example optimize, an actual validity period for a traffic encryption key used at the end of the service 602. The traffic encryption key used last as part of the service 602 is subsequently also called the residual traffic encryption key 614. The residual traffic encryption key 614 has a residual traffic encryption key validity time period 616.

In addition, FIG. 6 shows an example of an inadmissible residual traffic encryption key 618 with an excessively long validity period 620, which will be longer than the admissible validity 610.

In line with one embodiment, almost over the entire period of the service the preferred traffic encryption key lifetimes and the respective associated traffic encryption key are transmitted to the terminal (for example to a respective service client unit 108), for example within the transmitted (for example continuous) data stream of the service. Only at the end of the service are a freshly calculated and optimized traffic encryption key life and the associated traffic encryption key transmitted, since the preferred traffic encryption key life would be valid far beyond the period of the service and also beyond the still admissible extended validity.

If the "acceptable validity period" parameter were set to the value "zero", the traffic encryption key life calculated here in the example would also be too long. In this case, the traffic encryption key lifetimes should be much shorter. In this context, it may occur that the optimum period can be achieved only by a plurality of shorter traffic encryption key lifetimes.

FIG. 7 shows a method 700 for generating a traffic encryption key based on an embodiment.

One embodiment is based on the "modulo" function (division remainder), where the dividend is represented by the "service period" and the divisor is represented by the "preferred traffic encryption key life" (preferred TEK life). An additional parameter for controlling the lifetimes of the traffic encryption keys is called "acceptable validity". This describes the admissible validity of the life of the traffic encryption keys (residual traffic encryption keys) after the service 602 has expired in order to provide the service provider with the option of extending the validity of the traffic encryption key life beyond the end of the service. This parameter can also be set such that no extended validity beyond the end of the service 602 is accepted (in this case the acceptable validity period 612 would have the associated value "zero", for example).

The text below explains a few definitions of terms which are used within the context of this embodiment:
division remainder=$(a+c)$ mod $b$;
service period=$a$;
preferred traffic encryption key life=$b$;
acceptable validity period=$c$ (if >0).

Referring to FIG. 7, the start (e.g. in 702) of the method 700 is followed by a "new service period" being ascertained by adding "service period" and "acceptable validity period" (a+c), for example in 704.

In addition, in 706, a check is performed to determine whether the "new service period" is shorter than the "preferred traffic encryption key life".

If the "new service period" is shorter than the "preferred traffic encryption key life" ("yes" in 706), in 708 a "new preferred traffic encryption key life" is ascertained, for example by ascertaining the longest possible traffic encryption key life which is shorter than the "new service period".

If the "new service period" is not shorter than the "preferred traffic encryption key life" ("no" in 706) or following ascertainment of the "new preferred traffic encryption key life" in 708, in 710 an integer quotient is ascertained (in line with one embodiment, decimal places are trimmed, in other words rounded) from the variables "new service period" (dividend a) and "preferred traffic encryption key life" (divisor b). In 712, the division remainder is then ascertained from the variables "new service period" (dividend a) and "preferred traffic encryption key life" (divisor b).

In addition, in 714, a check is performed to determine whether the "division remainder" is greater than the "acceptable validity period". In other words, the variables "division remainder" and "acceptable validity period" for the traffic encryption key are compared after the service has expired.

If the "division remainder" is less than or equal to the variable "acceptable validity period" of the traffic encryption key after the service has expired ("no" in 714), all the traffic encryption key lifetimes have been calculated and the method is terminated at 716.

If, however, the "division remainder" is greater than the "acceptable validity period" of the traffic encryption key after the service has expired ("yes" in 714), in 718 the next smallest power of $2^n$ (less than "division remainder" in order to obtain as long a validity period for the traffic encryption key lifetimes as possible) is ascertained.

In 720, the ascertained next smallest power of $2^n$ is then stored as "further traffic encryption key life".

In addition, in 722 the ascertained next smallest power of $2^n$ is renamed "preferred traffic encryption key life", and at 724 the variable "division remainder" is renamed the variable "new service period".

The method is then continued in 712 using the renamed variables in a new iteration.

Clearly, in this embodiment the validity period of the traffic encryption key (residual traffic encryption key) used for encrypting the last data as part of the service 602 is matched in steps, in other words iteratively, to the admissible validity 612 and is thus optimized.

If, despite optimized key validity period matching, there still remains a period following expiry of the service 602 in which the residual traffic encryption key is valid then, in one embodiment, provision may be made for the service provider to transmit specific information for the respective subscriber to the respective service client unit 108, for example advertising, in this case.

In line with one embodiment, the service operator is able to match the lifetimes of traffic encryption keys to the service in optimum fashion. In this context, in line with one embodiment, the method allows both optimized adjustment of the validity of the traffic encryption key lifetimes (coincides with the end of the service, for example with precise accuracy) and variable extended adjustment of the validity of the traffic encryption key lifetimes (e.g. for advertising or preview).

The passage below shows an example calculation on the exemplary assumption that the service period is 3824 seconds, the preferred (default) traffic encryption key life is 256 seconds and the acceptable validity period is 0 seconds.

| Index | Calculation | Description |
| --- | --- | --- |
| a | 3824 + 0 = 3824 | Addition of "service period" and "acceptable validity". Result "new service period" |
| b | | Check whether the "new service period" is shorter than the "preferred traffic encryption key life" |
| | 3824 div | Ascertain integer quotient from the variables "new service period" and "preferred traffic encryption key life" |

-continued

| Index | Calculation | Description |
|---|---|---|
| 1 | 256 = 14 | Division remainder from the variables "new service period" and "preferred traffic encryption key life" |
| 2 * | 3824 mod 256 = 240 | "Division remainder" greater than "acceptable validity" |
| 3b * | 240 > 0 128 | Ascertain next smallest power of $2^n$ (less than "division remainder"), store as "further traffic encryption key life" and rename as "preferred traffic encryption key life" |
| 3bi, 3bii, 3biii * | | Rename "division remainder" "new service period" Division remainder from the variables "new service period" and "preferred traffic encryption key life" |
| 3biv * | 240 240 mod 128 = 112 | "Division remainder" greater than "acceptable validity" Ascertain next smallest power of $2^n$ (less than "division remainder"), store as "further traffic encryption key life" and rename as "preferred traffic encryption key life" |
| 2 ** | 112 > 0 | Rename "division remainder" "new service period" Division remainder from the variables "new service period" and "preferred traffic encryption key life" |
| 3b ** | 64 | "Division remainder" greater than "acceptable validity" |
| 3bi, 3bii, 3biii ** | | Ascertain next smallest power of $2^n$ (less than "division remainder"), store as "further traffic encryption key life" and rename as "preferred traffic encryption key life" |
| 3biv ** | 112 112 mod 64 = 48 | Rename "division remainder" "new service period" Division remainder from the variables "new service period" and "preferred traffic encryption key life" |
| 2 *** | 48 > 0 | "Division remainder" greater than "acceptable validity" |
| 3b *** | 32 | Ascertain next smallest power of $2^n$ (less than "division remainder"), store as "further traffic encryption key life" and rename as "preferred traffic encryption key life" |
| 3bi, 3bii, 3biii *** | | Rename "division remainder" "new service period" Division remainder from the variables "new service period" and "preferred traffic encryption key life" |
| 3biv *** | 48 48 mod 32 = 16 | "Division remainder" is less than or equal to "acceptable validity". All traffic encryption key lifetimes have been calculated and the algorithm is terminated. |
| 2 **** | 16 > 0 | |
| 3b **** | 16 | |
| 3bi, 3bii, 3biii **** | | |
| 3biv **** | 16 16 mod 16 = 0 | |
| 2 ***** | 0 = 0 | |
| 3a ***** | | |

The processes in the respective iterations are respectively identified in the table by "*" symbols (for example the processes in the first iteration are marked by "*" in the index field, the processes in the second iteration are marked by "" in the index field, the processes in the third iteration are marked by "*" in the index field, the processes in the fourth iteration are marked by "**" in the index field and the processes in the fifth iteration are marked by "***" in the index field).

This example shows how the optimum lifetimes for the traffic encryption keys (acceptable validity beyond the service is zero) can be calculated by the service operator. Overall, only a few calculations need to be performed. The calculations can be made in advance or else during the service. The lifetimes to be transmitted for the traffic encryption keys and the associated traffic encryption keys are, by way of example: 14×256; 1×128; 1×64; 1×32 and 1×16. The order in which these values need to be transmitted is not stipulated thereby, however.

In the second example calculation below, it is assumed that the service period is 3824 seconds and the preferred (default) traffic encryption key life is 256 seconds. In this example, the lifetimes of the traffic encryption keys are calculated such that the next service can still be received for a maximum of 60 seconds in unencrypted form, in other words the acceptable validity period is 60 seconds.

| Index | Calculation | Description |
|---|---|---|
| a | 3824 + 60 = 3884 | Addition of "service period" and "acceptable validity". Result "new service period" |
| b | | Check whether the "service period" is shorter than the "preferred traffic encryption key life" |
| 1 | 3884 div 256 = 15 | Integer quotient from the variables "new service period" and "preferred traffic encryption key life" |
| 2 | 3884 mod 256 = 44 | Division remainder from the variables "new service period" and "preferred traffic encryption key life" |
| 3a | 44 < 60 | "Division remainder" is less than or equal to the "acceptable validity". All of the traffic encryption key lifetimes have been calculated and the algorithm is terminated. |

This example shows how the lifetimes for the traffic encryption keys, including acceptable validity (validity beyond the service period) of 60 seconds, can be calculated by the service operator. Fewer calculations need to be performed than in the first specific numerical example above. In this example, provision could possibly be made for subscriber-specific information, which has nothing more to do with the service per se (for example advertising or program advice or preview), to be transmitted in the remaining 16 seconds (60−44=16) in which the last traffic encryption key is still valid. The lifetimes to be transmitted for the traffic encryption keys are, by way of example: 15×256.

It should be pointed out that the various units and functionalities based on the embodiments described above can be implemented in hardware, in other words using one or more appropriately configured electronic circuits, in software, in other words using one or more appropriately configured computer programs, or in any hybrid form, in other words in hardware or in software in any proportions.

Although the invention has been shown and described primarily in connection with specific embodiments, it should be understood by those persons who are familiar with the specialist field that many and diverse changes to the configuration and its details can be made without departing from the essence and scope of the invention as defined by the claims which follow. The scope of the invention is therefore determined by the appended claims, and it is intended that all alterations which are within the scope of the meaning and range of equivalence of the claims are covered by the claims.

What is claimed is:

1. A method for generating a traffic encryption key, the method comprising:
generating at least one traffic encryption key configured to encrypt data transmitted as part of a service, the traffic encryption key having a validity equal to a traffic encryption key validity time period;
checking whether a period for the service is longer than the traffic encryption key validity time period; and
when the period of the service is longer than the traffic encryption key validity time period,
ascertaining, by a hardware processor, a residual period which indicates by what period the service is longer than the traffic encryption key validity time period of the at least one traffic encryption key;
generating at least one residual traffic encryption key which is used for encrypting data transmitted as part of a service;
ascertaining a residual traffic encryption key validity time period which indicates for how long the residual traffic encryption key is valid, wherein ascertaining the residual traffic encryption key validity time period comprises:
checking whether the residual period is longer than a prescribed acceptable validity period; and
when the residual period is longer than the prescribed acceptable validity period, matching the residual traffic encryption key validity time period to the residual period iteratively; and
associating the residual traffic encryption key validity time period with the residual traffic encryption key.

2. The method as claimed in claim 1, wherein each iteration of matching the residual traffic encryption key validity time period to the residual period comprises:
when the residual period is longer than the prescribed acceptable validity period, reducing a preferred traffic encryption key validity time period by a prescribed value;
checking whether the residual period is longer than the preferred traffic encryption key validity time period;
when the residual period is not longer than the reduced preferred traffic encryption key validity time period, associating the preferred traffic encryption key validity time period with the residual traffic encryption key; and
when the residual period is longer than the reduced preferred traffic encryption key validity time period, associating the reduced preferred traffic encryption key validity time period with an additional residual traffic encryption key, defining the reduced preferred traffic encryption key validity time period as the preferred traffic encryption key validity time period, reducing the residual period by the reduced preferred traffic encryption key validity time period, defining the reduced residual period as the residual period, and performing an additional iteration.

3. The method as claimed in claim 2, wherein each iteration of matching the residual traffic encryption key validity time period to the residual period comprises:

when the residual period is longer than the prescribed acceptable validity period, reducing a preferred traffic encryption key validity time period by a value of a power to a prescribed base value.

4. The method as claimed in claim 3, wherein each iteration of matching the residual traffic encryption key validity time period to the residual period comprises:
when the residual period is longer than the prescribed acceptable validity period, reducing a preferred traffic encryption key validity time period by a value of a power to a base value two.

5. The method as claimed in claim 1, wherein the service is a broadcast service.

6. The method as claimed in claim 1, wherein the service is a video broadcast service or an audio broadcast service.

7. The method as claimed in claim 1, wherein the service is provided on the basis of an Open Mobile Alliance standard.

8. A method for transmitting data, the method comprising generating a traffic encryption key, wherein the generating the traffic encryption key comprises:
generating at least one traffic encryption key configured to encrypt data transmitted as part of a service, the traffic encryption key having a validity equal to a traffic encryption key validity time period;
checking whether a period for the service is longer than the traffic encryption key validity time period; and
when the period of the service is longer than the traffic encryption key validity time period,
ascertaining, by a hardware processor, a residual period which indicates by what period the service is longer than the traffic encryption key validity time period of the at least one traffic encryption key;
generating at least one residual traffic encryption key which is used for encrypting data transmitted as part of a service;
ascertaining a residual traffic encryption key validity time period which indicates for how long the residual traffic encryption key is valid, wherein ascertaining the residual traffic encryption key validity time period comprises:
checking whether the residual period is longer than a prescribed acceptable validity period; and
when the residual period is longer than the prescribed acceptable validity period, matching the residual traffic encryption key validity time period to the residual period iteratively; and
associating the residual traffic encryption key validity time period with the residual traffic encryption key;
encrypting data provided as part of the service using the traffic encryption key or the residual traffic encryption key; and
transmitting, by a data transmission network, the encrypted data.

9. A device for generating a traffic encryption key, the device comprising:
a first generation hardware unit configured to generate at least one traffic encryption key configured to encrypt data transmitted as part of a service, the traffic encryption key having a validity equal to a traffic encryption key validity time period;
a checking hardware unit configured to check whether a period for the service is longer than the traffic encryption key validity time period;
a first ascertainment hardware unit which is configured so that, when the period of the service is longer than the traffic encryption key validity time period, the first ascertainment hardware unit ascertains a residual period which indicates by what period the service is longer than the traffic encryption key validity time period of the at least one traffic encryption key;
a second generation hardware unit which is configured so that, when the period of the service is longer than the traffic encryption key validity time period, it generates at least one residual traffic encryption key which is used for encrypting data transmitted as part of a service;
a second ascertainment hardware unit which is configured so that, when the period of the service is longer than the traffic encryption key validity time period, it ascertains a residual traffic encryption key validity time period which indicates for how long the residual traffic encryption key is valid, wherein the second ascertainment hardware unit is further configured
to check whether the residual period is longer than a prescribed acceptable validity period; and
when the residual period is longer than the prescribed acceptable validity period, the second ascertainment hardware unit matches the residual traffic encryption key validity time period to the residual period iteratively; and
an association hardware unit which is configured so that, when the period of the service is longer than the traffic encryption key validity time period, it associates the residual traffic encryption key validity time period with the residual traffic encryption key.

10. The device as claimed in claim 9, wherein the second generation hardware unit is further configured so that each iteration of matching the residual traffic encryption key validity time period to the residual period comprises:
when the residual period is longer than the prescribed acceptable validity period, reducing a preferred traffic encryption key validity time period by a prescribed value;
checking whether the residual period is longer than the preferred traffic encryption key validity time period;
when the residual period is not longer than the reduced preferred traffic encryption key validity time period, associating the preferred traffic encryption key validity time period with the residual traffic encryption key; and
when the residual period is longer than the reduced preferred traffic encryption key validity time period, associating the reduced preferred traffic encryption key validity time period with an additional residual traffic encryption key, defining the reduced preferred traffic encryption key validity time period as the preferred traffic encryption key validity time period, reducing the residual period by the reduced preferred traffic encryption key validity time period, defining the reduced residual period as the residual period, and performing an additional iteration.

11. The device as claimed in claim 9, wherein the service is a broadcast service.

12. The device as claimed in claim 9, wherein the service is a video broadcast service or an audio broadcast service.

13. The device as claimed in claim 9, wherein the service is a service based on an Open Mobile Alliance standard.

14. A device for generating a traffic encryption key, comprising:
a first generation hardware unit configured to generate at least one traffic encryption key configured to encrypt data transmitted as part of a service, the traffic encryption key having a validity equal to a traffic encryption key validity time period;
a checking hardware unit configured to check whether a period for the service is longer than the traffic encryption key validity time period;

a direct ascertainment hardware unit is configured to ascertain, when the period of the service is longer than the traffic encryption key validity time period, a residual period which indicates by what period the service is longer than the traffic encryption key validity time period of the at least one traffic encryption key;

a second generation hardware unit is configured to generate, when the period of the service is longer than the traffic encryption key validity time period, at least one residual traffic encryption key which is used for encrypting data transmitted as part of a service;

a second ascertainment hardware unit is configured to ascertain, when the period of the service is longer than the traffic encryption key validity time period, a residual traffic encryption key validity time period which indicates for how long the residual traffic encryption key is valid, wherein the second ascertainment hardware unit is further configured to check whether the residual period is longer than a prescribed acceptable validity period; and when the residual period is longer than the prescribed acceptable validity period, the second ascertainment hardware unit matches the residual traffic encryption key validity time period to the residual period iteratively; and an association hardware unit is configured to associate, when the period of the service is longer than the traffic encryption key validity time period, the residual traffic encryption key validity time period with the residual traffic encryption key.

15. A data transmission arrangement, comprising:

a data transmission device configured to transmit data as part of provision of at least one service;

a device configured to generate a traffic encryption key, comprising:

a first generation hardware unit configured to generate at least one traffic encryption key configured to encrypt data transmitted as part of a service, the traffic encryption key having a validity equal to a traffic encryption key validity time period;

a checking hardware unit configured to check whether a period for the service is longer than the traffic encryption key validity time period;

a first ascertainment hardware unit which is configured so that, when the period of the service is longer than the traffic encryption key validity time period, the first ascertainment hardware unit ascertains a residual period which indicates by what period the service is longer than the traffic encryption key validity time period of the at least one traffic encryption key;

a second generation hardware unit which is configured so that, when the period of the service is longer than the traffic encryption key validity time period, the second generation hardware unit generates at least one residual traffic encryption key which is used for encrypting data transmitted as part of a service;

a second ascertainment hardware unit which is configured so that, when the period of the service is longer than the traffic encryption key validity time period, the second ascertainment hardware unit ascertains a residual traffic encryption key validity time period which indicates for how long the residual traffic encryption key is valid, wherein the second ascertainment hardware unit is further configured to check whether the residual period is longer than a prescribed acceptable validity period; and when the residual period is longer than the prescribed acceptable validity period, the second ascertainment hardware unit matches the residual traffic encryption key validity time period to the residual period iteratively; and an association hardware unit which is configured so that, when the period of the service is longer than the traffic encryption key validity time period, the association hardware unit associates the residual traffic encryption key validity time period with the residual traffic encryption key; and an encryption device configured to encrypt the data transmitted as part of the service using the traffic encryption key or the residual traffic encryption key.

* * * * *